United States Patent [19]

Crom et al.

[11] 4,176,397
[45] Nov. 27, 1979

[54] ELECTRICAL ODOMETER

[76] Inventors: Carol L. Crom; Elizabeth J. Crom, both of 1813 Arrow La., Garland, Tex. 75042

[21] Appl. No.: 863,887

[22] Filed: Dec. 23, 1977

[51] Int. Cl.$^2$ .............................................. G06F 15/20
[52] U.S. Cl. .............................. 364/561; 235/92 DN; 235/95 R; 364/449; 364/571
[58] Field of Search .............. 364/424, 449, 561, 571, 364/582; 235/92 DN, 92 TC, 95 R, 97, 61 J; 340/22, 23, 56; 324/166

[56] References Cited

U.S. PATENT DOCUMENTS

| | | | |
|---|---|---|---|
| 3,614,617 | 10/1971 | Blake, Jr. | 235/92 DN |
| 4,068,307 | 1/1978 | Floyd et al. | 364/424 |
| 4,068,308 | 1/1978 | Opper | 364/449 |
| 4,074,196 | 2/1978 | Webster | 324/166 |
| 4,103,332 | 7/1978 | Floyd et al. | 364/449 |

*Primary Examiner*—Errol A. Krass
*Attorney, Agent, or Firm*—Charles W. McHugh

[57] ABSTRACT

An electrical odometer for use in wheeled vehicles, including a transducer coupled in some manner to a wheel of the vehicle such that angular rotation of the wheel produces a series of discrete signals. The discrete signals are transformed into a first pulse train having a wave form shaped for driving a logic element. Optionally, the conditioned pulses may be divided so as to create a dependent pulse train which is then processed to produce a series of trigger pulses having approximately equal duration. A computer means for performing arithmetic operations is also provided, along with some switching means for selectively causing the computer means to perform an arithmetic operation upon the occurrence of each incoming pulse. A digital display is connected with the computer means, for displaying distance values. A means such as a numeric keyboard is provided for manually entering an initial distance value into the digital display. A switch permits selection of either a count-up mode or a count-down mode for the computer means, whereby distance increments may be added to or subtracted from the initial distance value in the digital display. One or more calibration constants, which correspond to the actual distance traveled between trigger pulses, may be employed to accommodate the selected rate at which the digital display is updated.

13 Claims, 9 Drawing Figures

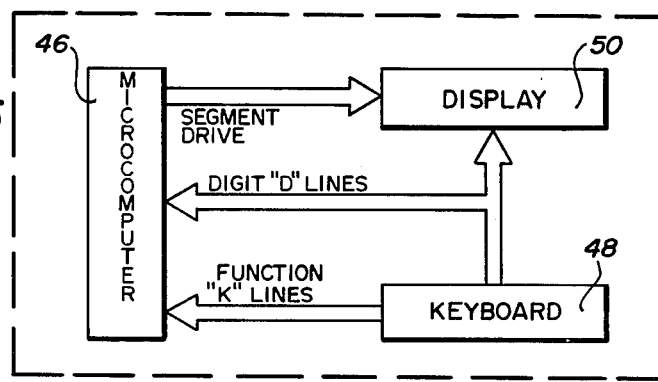
FIG. 5
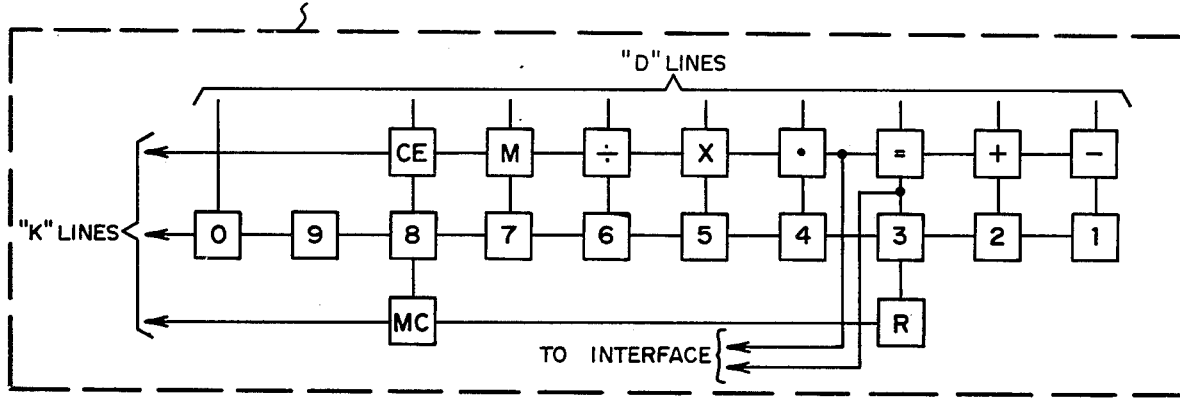
FIG. 6
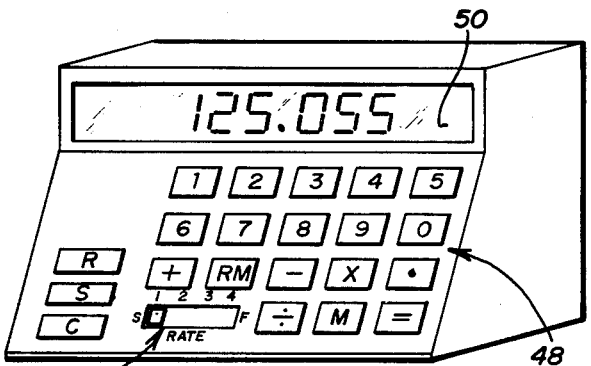
FIG. 7
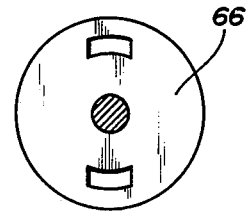
FIG. 9
FIG. 8
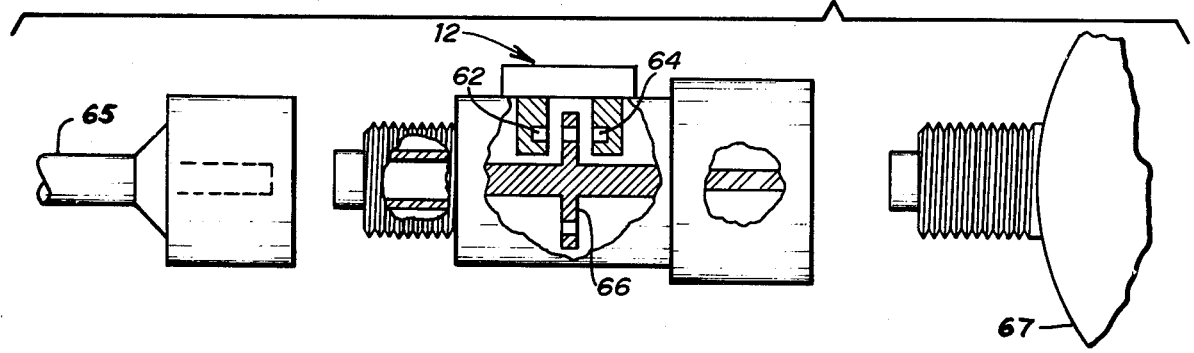

ELECTRICAL ODOMETER

This invention relates generally to odometer systems for road vehicles, and more particularly to an odometer system which is capable of being calibrated by the vehicle operator at will in order to achieve accurate distance measurements based upon a vehicle's travel.

Odometer systems for wheeled vehicles are well known, having been utilized on bicycles, automobiles, trucks, motorcycles, etc. for many years. Among those odometers which have been patented are those disclosed in U.S. Pat. Nos. 2,634,914 to Lyon and 3,226,021 to Dusinberre et al. Among the more recent systems are those which operate electrically, including those described in U.S. Pat. Nos. 3,659,780 to Woodward, 3,780,272 to Rohner, and 3,872,288 to Sampey. Because the state of the art of odometers has been so well developed, it would be onerous to recite each and every feature that has been suggested or disclosed in the many patents in this field. However, this is not to say that there is no longer any room for improvement in odometers; and, a recitation of two common problems involving road vehicles will serve to illustrate some advantages of the invention disclosed herein.

First, it should be appreciated that odometers of the prior art for any given vehicle cannot be any more accurate than the underlying members upon which a mileage indication is to be derived. Many prior art odometers have employed levers, wheels, knobs and switches, etc., which inherently contribute to a certain amount of inaccuracy—after many years of a vehicle's use if not when it is new. For example, odometers for American-made vehicles are typically driven through a system of reduction gearing by the core of a conventional speedometer cable. The core of the speedometer cable is, in turn, driven by either the transmission or a front wheel. The nominal number of revolutions of the speedometer cable, per mile of traveled distance, are specified by industry-wide standards such as those established by the Society of Automotive Engineers. Such specifications are very enlightening to the extent that they define tolerances. For example, SAE J678 specifies that speedometer cable cores driven by the transmission is being driven with a gear ratio that will nominally produce 1000 revolutions of cable core for every mile of vehicle travel. However, this SAE specification does allow a deviation from the preferred 1000 revolutions of as much as minus 1 percent to plus 3.75 percent in order to accommodate practical gear-train drive ratios. The extent to which design variations in individual gear trains may affect accuracy of an odometer are, of course, difficult to predict.

In addition to accuracy limitations which are the result of design choices, SAE specification 862b lists many variable factors affecting odometer accuracy which are not controllable by design. These variable factors produce variations in the wheel-rolling radius—which directly affects odometer accuracy. For example, it is known that tires are elastic members, and the rolling radius is subject to variation from tire to tire as a result of manufacturing tolerances. But, even with respect to a single tire there are other variations that arise from changes in temperature, inflation pressures, wear and loading. Also, an automobile tire will tend to change size due to aging after it is placed on a rim and inflated. Such tire variations, plus differences in construction, material and tread design, can result in a number of tire revolutions per mile which is significantly different from the nominal value set by any agency or engineer. Indeed, the number of revolutions per mile obtained from old tires in comparison with their performance when they were new can be nearly 3 percent.

Vehicle speed will also affect the accuracy of prior art odometers. An average automobile tire experiences up to a 3 percent change in revolutions per mile when the vehicle speed changes from 30 mph to 90 mph, as a result of a change in rolling radius caused by centrifugal force. Of course, the actual change in revolutions per mile resulting from speed changes for any given tire will be dependent on the characteristics of that particular tire. And, while some odometer errors may be controllable, others—such as tire temperature—are not.

To illustrate how some errors may affect the accuracy of an odometer, let it be assumed that there is a desire by a vehicle operator to synchronize an odometer in his vehicle with the mileage markers on an interstate highway. Furthermore, it will be assumed that any error in synchronization should be as low as 0.2 miles. If the only source of error was that due to the upper SAE design limit of 3.75 percent for the odometer drive, a useful measurement criterion would be the maximum distance that could be traveled without exceeding the error of 0.2 miles. The distance which could be traveled would be 0.2 divided by 0.0375 or 5.33 miles. Thus, to obtain synchronization with the mileage markers to within 0.2 miles would require the operator to re-synchronize about every fifth mileage marker.

The present invention overcomes these accuracy problems by providing an odometer system which can be easily and precisely calibrated by the driver while the vehicle is in motion, simply by driving a course of any precisely known distance and then using a simple arithmetical operational procedure with a calculator or the like. Later, if the number of wheel revolutions per mile should begin to vary as radically different operating conditions are encountered, the odometer can be freshly calibrated by the driver at any time.

In brief, the present invention derives the distance traveled from wheel rotation, like most other odometers for road vehicles. The wheel rotation information is converted into a series of electrical pulses, with each pulse corresponding to a specific distance traveled. The pulse train is then applied to a pulse rate divider which provides a means for selecting the desired resolution and data update rate. The pulse train output from the divider is shaped to provide a trigger pulse which is subsequently applied to a microcomputer to initiate an arithmetic routine which causes a constant (previously stored in memory) to be added to or subtracted from the distance display register. The constant is a calibration constant which would normally be derived by the user of the odometer, and it may be very precise. Once a calibration constant has been derived for a particular operational condition, the constant can be reentered in the microcomputer at any time. A keyboard can also be used to preset an initial reference distance, and to set the add or subtract function for distance traveled. In one embodiment, the electrical pulses derived from a transducer are conditioned and then passed directly to a computer interface without being divided. In another embodiment, at least two divide ratios are provided—and those two ratios differ by a factor of at least 16, so that the update rate for the digital display may be changed by a factor of 16 through the act of switching divide ratios.

BRIEF DESCRIPTION OF THE DRAWING

FIG. 5 is a diagrammatic showing in the nature of a block diagram for a typical digital calculator (which employs a microcomputer chip), a readout (which is preferably a digital display), and a keyboard which is also used to establish an initial distance value in the display;

FIG. 6 is a schematic diagram of a typical matrix keyboard used for the calculator;

FIG. 7 is a perspective view of one embodiment of the invention showing a possible spatial relationship between a keyboard, a digital display, and a housing for the circuitry shown in FIG. 1;

FIG. 8 is a partially exploded, elevational view of one embodiment of a transducer which is adapted to be connected immediately adjacent the transmission of a wheeled vehicle such as an automobile where it is then in series with the original speedometer cable.

FIG. 9 is a front elevation view of the rotative element which constitutes the optical interrupter in the transducer shown in FIG. 8.

Figure 1:
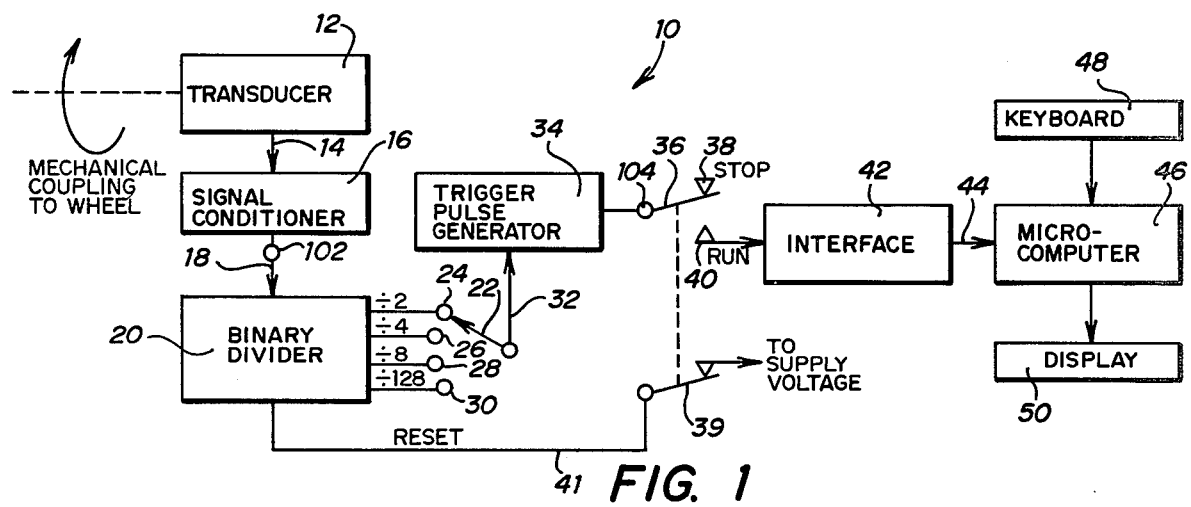
FIG. 1 is a block diagram of the electrical odometer system of the invention which includes a transducer and a circuit for generating a series of trigger pulses which are operative to cause a computer means to perform an arithmetic operation and to subsequently display a distance value on a digital display.

Referring initially to FIG. 1, a transducer 12 is provided which will produce a series of discrete signals upon movement of the vehicle. Typically, the transducer 12 is coupled to a wheel of the vehicle in which the odometer is mounted, such that angular rotation of said wheel produces the series of discrete signals. The transducer 12 can also be coupled to the vehicle's drive shaft instead of a wheel, and it may be arranged so that it is driven by the speedometer cable which is standard equipment on all modern vehicles. The transducer may be any one of a variety of well-known devices, including that shown in U.S. Pat. No. 3,406,775 to Magnuski or U.S. Pat. No. 3,983,372 to Klaver. However, in order to foster the accuracy which is a significant feature of this invention, it is preferred that the transducer provide a relatively large number of electrical pulses for each full revolution of the vehicle's wheel. In any case, however, it is important that the number of electrical pulses generated by the transducer 12 be directly proportional to the distance traveled by the vehicle.

The output of transducer 12 is passed through suitable means 14 to a signal conditioner 16, which converts the transducer pulses (which usually have relatively low rise-times) into sharp rise-time pulses that are compatible with a digital divider 20. The signal conditioner 16 also includes circuitry (which will subsequently be described in connection with FIG. 3) which provides substantial noise immunity to the divider 20.

The divider 20 is implemented by a binary counter, and provides exact scale factors for controlling the rate at which data in the odometer is updated. Such a divider is advantageous because usually a different update rate will be selected for calibration than will be used for routine operation of the odometer. A switch 22 is a multi-position switch, providing means for the user to manually select a particular divide ratio so as to produce a desired update rate. With the vehicle driving at a constant speed, the output of each of the divider taps 24, 26, 28, 30 will normally be a square wave whose period is a function of vehicle speed and the respective division constant, e.g., 2, 4, 8.

The output of the divider 20 is passed through switch 22 and means 32 to a trigger pulse generator 34, which converts the selected square wave into a trigger pulse of nearly constant duration—which ultimately initiates an addition or subtraction routine in a microcomputer 46.

An interface 42 is provided between the trigger pulse generator 34 and the microcomputer 46, in order to provide a proper impedance for the generator 34 and to provide a suitable command signal for the microcomputer 46. The trigger pulse generator 34 is connected to interface 42 through DPDT switch 36 which has a stop contact 38 and a run contact 40. When the switch 36 is in the stop position, the divider 20 is reset to zero by switch contact 39 and conductor 41.

In the preferred embodiment, the microcomputer 46 and a keyboard 48, as well as a display 50, are wired and packaged similarly to that of a common four-function, hand-held electronic calculator having a memory and automatic constant features. In addition to the arithmetic functions of a microcomputer chip which is used in such calculators, the chip contains the circuitry which is necessary for multiplexing the display and scanning the keyboard, etc.

Figure 2:
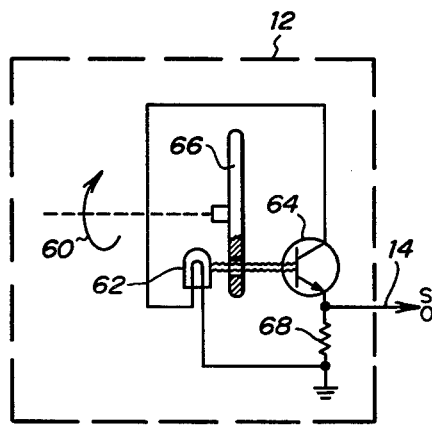
FIG. 2 is a schematic diagram of a transducer section which is shown in block form in FIG. 1, with an optical coupler device being used to convert angular rotation into a series of discrete electrical signals.

Having generally described the basic components of an electrical odometer 10 for use in wheeled vehicles, more detailed attention will now be given to specific components of a preferred embodiment. Referring specifically to FIG. 2, the transducer 12 is adapted to convert angular rotation of a vehicle wheel (exemplified by the arrow 60) into a series of discrete signals. In the embodiment shown, this is accomplished optically by coupling an adapter to the readily accessible end of a speedometer cable, so that rotation of the speedometer cable can be sensed without interfering with the normal operation of said cable. That is, discrete signals are derived from said cable for use in this invention, but the cable continues to drive the speedometer which comes as standard equipment from the vehicle manufacturer.

The transducer 12 includes an optical energy source 62, a phototransistor switch 64, and an optical interrupter 66 positioned between elements 62, 64. The optical interrupter 66 is coupled to the speedometer cable in order to rotate therewith. Suitable holes or slots in the interrupter 66 allow passage of optical energy from the source 62 to the phototransistor 64 when said holes become aligned with a direct path between elements 62, 64. The optical energy impinging on phototransistor 64 creates a current flow from the positive voltage source to ground. This current flow establishes a voltage drop across resistor 68 to provide a signal output. Thus, for each revolution of the optical interrupter 66, the number of output pulses will be equal to the number of holes or slots in the optical interrupter. And, as will be explained more fully hereinafter, selection of an optimum number of output pulses can enhance the accuracy of the odometer 10.

Figure 3:
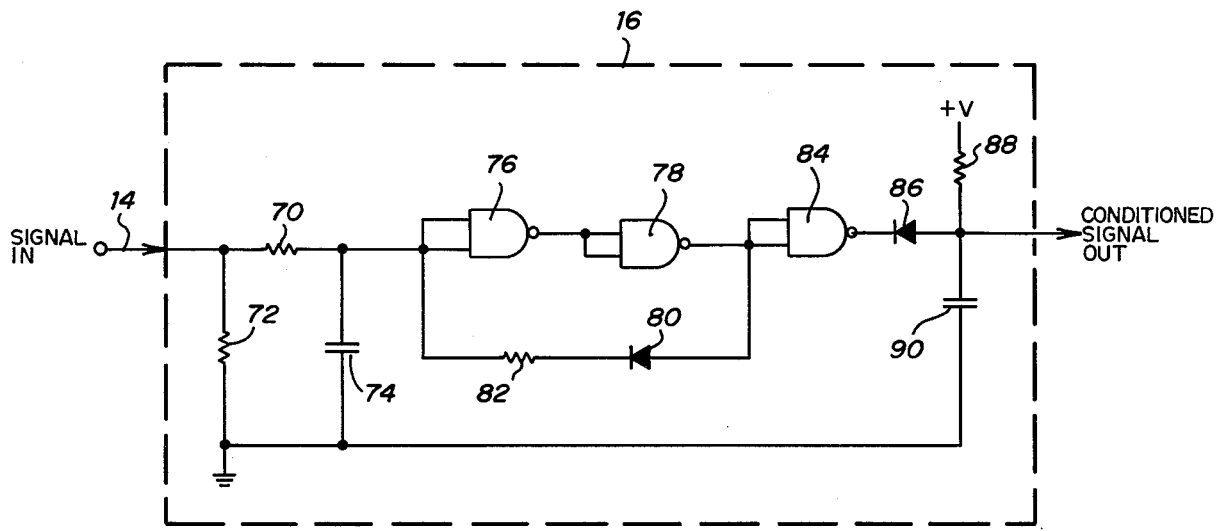
FIG. 3 is a schematic diagram of the signal conditioner shown in block form in FIG. 1, with the conditioned signal being characterized by a fast rise time so as to improve compatibility with logic elements in the circuit.

Referring next to FIG. 3, the signal conditioner 16 includes a low-pass filter section, three NAND logic elements, and an output section. Resistors 70, 72 and capacitor 74 form a low-pass filter section, which serves to reduce high-frequency noise and thereby improve over-all noise immunity. Logic elements 76, 78 (which are preferably COSMOS logic elements because of their high immunity to electrical noise) are connected in a positive feedback arrangement, in order to provide a toggle action which causes the logic state to be rapidly switched when the input signal exceeds an upper threshold value. The feedback path is through diode 80 and resistor 82 and appropriate conductors. Once the input threshold is exceeded, current which is fed back through the feedback network adds to the current from the signal source. Logic gate 84 is used primarily as an inverter to provide an appropriate output polarity. Resistor 88 is a pull-up resistor which provides proper circuit loading; and, diode 86 acts in conjunction with capacitor 90 to minimize opposite-polarity, high-frequency transients coupling with the divider 20.

A preferred divider 20 is a conventional COSMOS 7-stage binary ripple counter. The number of stages required for such a counter is determined by the maximum divisor (i.e., divide ratio) which is required for a particular embodiment. The divider/counter 20 is automatically reset to zero and held there when switch 39 (FIG. 1) is in the stop position.

Figure 4:
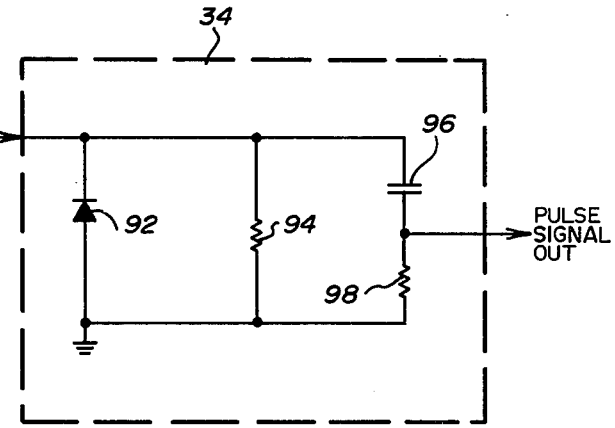
FIG. 4 is a schematic diagram of the trigger pulse generator shown in block form in FIG. 1, with said generator being advantageously used to improve the response of the computer means and to simplify the computer interface shown in FIG. 1.

The output of a particular counter tap 24, 26, 28, 30 is a square wave when the counters are being clocked at a constant rate. This square wave signal must be conditioned to provide a trigger pulse whose duration is relatively independent of the input clock rate. Such conditioning is accomplished by the trigger pulse generator 34 shown in FIG. 4. The input square wave is clamped to zero by diode 92, and the positive-going square wave is applied across capacitor 96 in series with resistor 98. The initial voltage drop across the capacitor 96 is zero; hence, the full output voltage is initially dropped across resistor 98 to provide a pulsed output signal. Immediately, however, capacitor 96 begins to charge as a result of the positive signal being applied thereto, until essentially the entire applied voltage is dropped across capacitor 96. The output signal of generator 34 thereby approaches zero as the voltage across capacitor 96 approaches the applied voltage. The time constant, and hence the duration of the trigger pulses, is dependent on the product of the values of capacitor 96 and resistor 98, and may typically be about 0.1 sec. Resistor 94 provides component protection by establishing a discharge path for the capacitor 96 when the circuit is disconnected.

The interface 42 (which receives the train of trigger pulses from generator 34) is preferably a solid state electronic switch which opens and closes in synchronism with each trigger pulse. A suitable switch will provide a high impedance input for minimizing distortion of the trigger pulse and circuit loading. The interface switch 42 also provides a high on/off resistance ratio, which is necessary for the switch-closure function that is required to initiate computer operations. Turning next to FIGS. 5 and 6, there is depicted a typical interconnection between the microcomputer 46 (which preferably is a single LSI calculator chip), a keyboard 48 and the display 50. A typical matrix keyboard schematic arrangement is shown in FIG. 6. The switch contacts connect horizontal matrix lines to vertical matrix lines when they are manually depressed, as in typical handheld calculator operation. In the preferred embodiment, the interface 42 provides a switch closure of two electrical contacts which are connected in parallel with the contacts for the "equal" key, so as to provide remote control of the equal key function. This is made possible by virtue of the automatic constant features which are incorporated into conventional LSI calculator chips. This automatic constant feature provides "repeat" operation for any operant which has previously been keyed-in on the keyboard. For example, if any number (such as the odometer calibration constant) is keyed-in on a keyboard 48, subsequent closure of the equal key will cause the display 50 to increment by the keyed-in number every time that the contacts associated with the equal key are closed. Similarly, if any number is to be subtracted from a displayed number, repeated closures of the equal key contacts will cause the displayed number to decrement by the keyed-in number each time the contacts are closed. It will be seen, therefore, that in accordance with the circuit described herein, each trigger pulse from the trigger generator 34 causes a contact closure of the interface switch 42; this, in turn, causes the calculator 46 to perform the previously keyed-in arithmetic function (plus or minus the calibration constant) on the contents of display 50. Too, each trigger pulse from generator 34 is directly dependent upon the distance traveled. Therefore, if the keyed-in number (which is held in the automatic constant register) is made equal to the calibration constant, then subsequent applications of each trigger pulse will cause the distance actually traveled by the vehicle to be added to (or subtracted from) the display 50, according to whether the operator had selected either the plus or minus operant.

In one working model of the circuitry described herein, the transistors and capacitors—and their respective values—are given in Table 1, as well as manufacturer's identifying numbers for other components of one embodiment of the invention.

TABLE 1

| Diodes | 80 | 1N914 |
|---|---|---|
|  | 86 | 1N914 |
|  | 92 | 1N914 |
| Capacitors | 74 | 0.1 MFD |
|  | 90 | 0.001 MFD |
|  | 96 | 0.1 MFD |
| Resistors | 68 | 1 KΩ |
|  | 70 | 100 KΩ |
|  | 72 | 100 KΩ |
|  | 82 | 33 KΩ |
|  | 88 | 3.3 KΩ |
|  | 94 | 330 KΩ |
|  | 98 | 1 MΩ |
| Logic Elements | 76 | RCA CD4011 |
|  | 78 | RCA CD4011 |
|  | 84 | RCA CD4011 |
| Divider |  | RCA CD4024 |
| Quad Switch (interface) | 42 | RCA CD4066 |

A suitable optical interrupter (62, 64) is a GE H13a1-2 or H13B. A suitable calculator chip to serve the function of the microcomputer 46 would be a Mostek MK 50321 N 8-digit calculator circuit; however, one prototype of the invention was made with a commercially available Rockwell calculator having therein an A5901 CA chip.

It is perhaps appropriate at this time to consider odometers in a mathematical sense. Ideally, the distance registered by an odometer ($R_b$) at the instant that a vehicle is physically present at some point b can be represented by the continuous integral $$R_b = \pm \int_a^b ds + R_a \quad (A)$$

where:
$R_a$ is the initial registration at point a
ds is the incremental differenial distance in the direction of travel and
$\pm$ is selected depending whether the registration is increasing or decreasing with travel.

If the distance function is allowed to be accumulated on an incremental basis instead of continuously, then the registered distance would be given by $$R_b = \pm \sum_{i=1}^{N} K\Delta X_i + R_a \quad (B)$$

where:
K is a constant
$\Delta X_i$ is the incremental distance in arbitrary units related to the desired units by the constant K, and
$R_a$ is as in Equation (A).

In general, most mechanical odometers are based upon an implementation of equation A, while most electronic odometers would likely implement some form of equation B. In the present invention, $\Delta X_i$ is selected as a constant parameter. The following equation may then be written.

$$\sum_{i=1}^{N} K\Delta X_i = K\Delta X_1 + K\Delta X_2 + K\Delta X_3 + \ldots + K\Delta X_N \quad (C)$$

Another form of this equation is $$\sum_{i=1}^{N} K\Delta X_i = (K\Delta X)N \quad (D)$$

Since $X_i$ is assumed to be held constant, both of the latter two equations provide the same answer. However, the implementation of the two forms is not identical. Implementation of equation C (which is used in the present invention) employs *addition* for its arithmetic operation, whereas the second form uses multiplication. Naturally, an operation must be performed each time that the distance register is updated; and, since microcomputer addition operations are faster than multiplication operations, then the implementation of equation C minimizes the speed requirement for a microcomputer 46. (For previous odometers which have not used a microcomputer, the implementation of equation D has generally been more advantageous.) A further advantage of the implementation of equation C is that the interface electronics which provide an input to the microcomputer 46 are relatively simple, because only simple trigger pulses are required in order to perform the summation steps. On the other hand, to implement equation D would require a relatively complex encoder.

The concept of the calibration constant as employed herein can perhaps best be understood by describing an algorithm in the form of a procedure for deriving a typical calibration constant. First, it will be assumed that at least two display rates (fast and slow) are selectable with a particular embodiment, and that one of these display rates may be manually selected by the user through movement of a slide switch on the keyboard 48. Also, it will be assumed that the faster display rate corresponds to a divide ratio of $\frac{1}{8}$, and that the slower display rate corresponds to a divide ratio of 1/128. Referring next to an exemplary keyboard 48 shown in FIG. 7, the vehicle owner would first clear his odometer by pressing the clear key C with the unit stopped. Assuming that he wishes to update his display at the faster rate, he would move the slide switch to the right so that it is adjacent F. This will cause the accumulation of the largest quantity of trigger pulses in the shortest period of time. Next, the operator would manually key in the plus key (to increment distance traveled from zero), and the "1" key—so that each trigger pulse will increment the display by 1. When the vehicle reached the beginning of a known calibration course, the operator would start his electronic odometer 10 by depressing the run key R. The vehicle would then travel a known distance along the calibration course at the operating speed for which the most accurate calibration is desired. It does not make any difference whether the known distance D is in feet, miles, kilometers or some other units, because the calibration constant which is to be calculated will be in the same units. At the end of the calibration course, the operator would depress stop key S to halt the incrementing operation of the odometer.

In one example, a known distance D of 5 miles was traveled; and the displayed value N on the display 50 was 1260. Advantageously using the calculator which is available, the displayed value N could be entered in the calculator memory by depressing memory key M. With the displayed value N being stored, the operator would then enter—using the keyboard 48—the known distance which was traveled during the calibration run. The operator would then divide the traveled distance D by the value of N stored in memory, to obtain the calibration constant for the divide ratio which had been selected for calibration. The calculation is:

$$K_{\frac{1}{8}} = 5 \div 1260 = 0.00397$$

The result is numerically equal to the actual distance traveled for each trigger pulse generated by pulse generator 34 when the divide ratio of $\frac{1}{8}$ is selected as the desired update rate. A similar calibration constant would be calculated for any other divide ratios, but it is not necessary to re-run the course to do so. That is, the data obtained from the run using $\frac{1}{8}$ as the divide ratio can be used to calculate the other calibration constants by using the relation between $\frac{1}{8}$ and the new divide ratio. For a divide ratio of 1/128, the calibration constant will be 16 times larger because $\frac{1}{8}$ is 16 times larger than 1/128. Hence, $K_{1/128}$ will be 0.06349. Both of these calibration constants would be recorded somewhere for subsequent use by the vehicle operator.

Perhaps it should be mentioned here that it is not necessary for practice of the invention to have more than one divide ratio for the incoming signals from the transducer 12. However, if a person is ever bothered by watching rapidly changing numerals in a display 50, it is convenient to be able to slow down the rate of change of the display; having both a fast and slow up-date rate satisfies this desire.

Actual operation of the odometer will perhaps be better understood from the following description of some exemplary uses of the electronic odometer. Let it be assumed that the odometer has been suitably calibrated as described above, and that the calibration constant K has been stored in memory. And, let it be assumed that the vehicle is about to be driven on a trip of some known distance, and the operator would like to know throughout the trip how much further he has to travel before reaching his destination. In such a case, with the electronic odometer 10 being in its stop mode, the distance to the destination would be entered on the display 50 using the keyboard 48. The operator would then depress the minus key, and he would recall the stored calibration constant K by depressing key RM. These two steps will set up the microcomputer 46 for subtracting the calibration constant K from the displayed distance each time a pulse is received at interface 42. With the electronic odometer suitably prepared, the operator would simply depress run key R at the reference point where the run is to start. As the vehicle continues to progress toward its destination, the remaining distance to be traveled will be displayed and updated throughout the trip.

In another example, let it be assumed that the electronic odometer 10 is to be used to record the actual distance traveled from a starting point, which will be arbitrarily established as zero. With the odometer in its stop mode, the operator would enter zero with the keyboard. Next, he would depress the plus key, and recall the calibration constant which had been stored in memory by depressing key RM. These steps will set up the microcomputer 46 for adding the calibration constant K to the displayed distance each time that a trigger pulse is received at the interface 42. Finally, the run key R is depressed, so that movement of the vehicle will begin operation of the odometer 10. It should perhaps be noted here that measuring traveled distance as a function of wheel rotation is obviously more reliable than trying to establish traveled distance as a function of some other parameter—such as engine operation. For example, if a person should attempt to derive signals from the engine's distributor or the like, then inaccuracy would creep into the computed distance every time that the vehicle stopped at a traffic light or stop sign, etc. To the extent that the engine might sometimes be running when the vehicle is not in motion, any raw signal which is derived from the engine (instead of a wheel) will have built-in opportunity for error.

In order to use the electronic odometer disclosed herein along a location-referenced highway system (such as the U.S. Interstate Highway system), the operator would first determine if reference markers are numerically increasing or decreasing in his direction of travel. Next, the operator would enter the number of a location marker which is to be used as a starting reference, e.g., 535, meaning that the vehicle will be located at mile marker 535 along a particular highway. If the location markers are numerically increasing, the operator would depress the plus key, and then depress the RM key to recall the calibration constant K from memory. This procedure must be followed with the electronic odometer in its stop mode, but the vehicle itself does not have to be stopped. Hence, the vehicle operator may have determined back when he was at mileage marker 534 that he wished to subsequently synchronize his odometer with the road's mileage markers. Then, when his vehicle arrived at marker 535, the operator would simply press run key R to start the distance accumulation. Thereafter, the exact position of the vehicle along the highway can be ascertained by simply looking at the display 50; and, the vehicle operator would not have to be exactly at one of the mileage markers in order to be able to communicate with someone so as to accurately advise them of his location.

Another advantage of the odometer 10 is that it fosters the accurate measurement of distances along roads which have no mileage markers or even signs. In a forest, for example, where there are numerous logging roads turning both right and left with great regularity, it may be very difficult for a newcomer to recognize the right place to turn off a main trail to get to a fishing camp or the like. Such difficulties in landmark recognition are compounded, of course, when directions may be given to a driver based on what he can see during the daytime—and he belatedly arrives at the general vicinity of his destination on a rainy and foggy night. The opportunity to rely on accurate mileage readings from an odometer 10 instead of temporarily concealed landmarks should bring many a traveler more quickly to his intended stopping place.

On the subject of accuracy, the results of testing some early prototypes should be informative. One prototype of the invention was checked on a trip of 27.36124 miles and then checked again (with the same calibration constant) to determine repeatability of the system. The difference between the two measured distances was 0.02382 miles, which corresponds to about 0.087 percent error in repeatability. On another trip on a smooth highway which had mileage markers placed periodically along the highway, synchronization with mileage markers was maintained for greater than 100 miles with an error of less than 0.2 miles. The significance of this accuracy will perhaps be better appreciated when the impact of certain operational parameters for a vehicle is considered. For example, to show how sensitive a conventional automobile is to conditions that are not under the control of the vehicle's manufacturer, a five-mile test course was traveled at 55 mph with the tire pressure in all four tires at 30 psi. Then, the same course was traveled at the same speed but with tire pressure deliberately reduced to 20 psi. The calibration constant ($K_i$) at 20 psi was 0.00387, which constitutes a difference of about 2.5 percent in comparison with the test at 30 psi. In view of the fact that a difference of 10 psi in tire pressure can have such a significant effect in distance measurement, the accuracy available with the electrical and mechanical features of this invention far exceed what might ever be significant in routine distance measurement.

In a preferred embodiment of the invention, the transducer 12 constitutes an element which is placed in series with the standard speedometer cable 65 of a wheeled vehicle, as shown in FIG. 8. This embodiment is adapted to be positioned immediately adjacent the transmission of the vehicle, with one end of the transducer housing having suitable threads for mating with a fitting on the transmission shell 67. In such a construction, a rotative element 66 (FIG. 9) will be driven simultaneously with the speedometer cable that is affixed to the other end of the transducer housing. In this way, the original speedometer and odometer which came as original equipment with the vehicle are not affected by the addition of an electrical odometer according to this invention.

In another embodiment of the invention the binary divider 20 and trigger pulse generator 34 shown in FIG. 1 may be optionally omitted, by connecting terminal 102 directly to terminal 104. This will naturally have the effect of greatly increasing the number of signal pulses that are passed to the microcomputer—as compared with those embodiments which include a divider. If means are provided to control the digital display so that it does not update so fast as to be distracting, then such an embodiment may prove to be desirable.

While only a few embodiments of the invention have been disclosed herein in great detail, it will be apparent to those skilled in the art that modifications thereof may be accomplished without departing from the spirit and scope of the invention— which is particularly identified in the claims appended hereto.

What is claimed is:

1. An electrical odometer for use in a wheeled vehicle, comprising:
   (a) means for generating a first series of electrical pulses which are related to a given unit of distance traveled by the vehicle;
   (b) means for conditioning said first series of pulses to provide a train of shaped pulses which are effective to initiate a computer routine;
   (c) a digital display adapted to serve as an odometer register;
   (d) means for presetting said digital display to a start count and for placing said start count in the memory of a computer; and
   (e) electronic computer means for algebraically summing a predetermined constant upon receiving respective ones of the train of shaped pulses, with a present value in the computer memory being the same as the start count, such that the instantaneous count which is held in the memory is progressively updated as each shaped pulse is received, with the count being displayed on the digital display being the same as the count stored in the computer memory, and said predetermined constant being the actual distance traveled between each consecutive pair of pulses in the train of shaped pulses, and the predetermined constant being based upon all of the relevant parameters which are associated with the vehicle on which the odometer is mounted, with said parameters including vehicle wheel size, tire inflation conditions, vehicle speed, and vehicle loading.

2. An electrical odometer for use in wheeled vehicles, comprising:
   (a) a transducer coupled to the vehicle so that angular rotation of a wheel produces a first series of discrete signals which are related to a given unit of distance traveled by the vehicle;
   (b) means for transforming said discrete signals into a pulse train of electrical signals which vary periodically with said discrete signals, with the waveform of said electrical signals being shaped for driving a computer logic element;
   (c) means for conditioning said pulse train to form a similar pulse train consisting of trigger pulses, each having approximately equal duration;
   (d) a digital display adapted to serve as an odometer register;
   (e) means for presetting said digital display to a start count and for placing said start count in the memory of a computer;
   (f) electronic computer means for algebraically summing a predetermined constant upon receiving respective ones of the train of trigger pulses, with a preset value in the computer memory being the same as the start count, such that the instantaneous count which is held in the memory is progressively updated as each trigger pulse is received, with the count being displayed on the digital display being the same as the count stored in the computer memory, and said predetermined constant being the actual distance traveled between each consecutive pair of pulses in the train of trigger pulses, and the predetermined constant being based upon the relevant parameters which are uniquely associated with the vehicle on which the odometer is mounted;
   (g) means for selectively starting and stopping the electronic computer means while the vehicle is in motion, with stopping said computer means being effective to permit presetting of the digital display to a start count, and starting said computer means being effective so as to enable it to respond to the trigger pulses; and
   (h) means for selecting either a count-up mode or a count-down mode for the computer means, whereby distance increments may be added to or subtracted from the initial distance value in the digital display.

3. An electrical odometer for use in a wheeled vehicle, comprising:
   (a) means for generating a first series of electrical pulses which are related to a given unit of distance traveled by the vehicle;
   (b) means for conditioning said first series of pulses to provide a train of shaped pulses which are effective to initiate a computer routine;
   (c) a digital display adapted to serve as an odometer register;
   (d) means for presetting said digital display to a start count and for placing said start count in the memory of a computer;
   (e) electronic computer means for algebraically summing a predetermined constant upon receiving respective ones of the train of shaped pulses, with a preset value in the computer memory being the same as the start count, such that the instantaneous count which is held in the memory is progressively updated as each shaped pulse is received, with the count being displayed on the digital display being the same as the count stored in the computer memory;
   (f) means for creating at least one dependent pulse train which is a fraction of the first series of electrical pulses, with said dependent pulse train being related to the first series of electrical pulses by a factor which is a rational number, and the dependent pulse train being synchronized with respect to the first series of electrical pulses; and
   (g) selector means to establish whether the electronic computer means acts in response to each of the first series of electrical pulses, or in response to each pulse in the dependent pulse train, whereby the up-date rate of the computer means may be selectively chosen.

4. The electrical odometer as claimed in claim 3 wherein there are at least two dependent pulse trains derived from said series of first electrical pulses, and further including selector means for selecting which one of the dependent pulse trains is passed to the computer means at a given time.

5. An electrical odometer for use in wheeled vehicles, comprising:
  (a) a transducer for converting repetitive wheel rotations into a series of discrete signals;
  (b) a digital display for displaying distance values;
  (c) means for manually entering an initial distance value into the digital display;
  (d) computer means for either adding or subtracting a calibration constant to the distance value which is presented by the digital display, with said calibration constant constituting the actual distance traveled between each of the discrete signals generated by the transducer; and
  (e) means for manually entering the calibration constant into the memory of said computer means with a numeric keyboard, said calibration constant being based upon all of the relevant parameters which are associated with the vehicle on which the odometer is mounted, with said parameters including vehicle wheel size, tire inflation conditions, vehicle speed, and vehicle loading.

6. The electrical odometer as claimed in claim 5 and further including means for adjustably establishing the rate at which the digital display is updated as a result of movement by said wheeled vehicle.

7. An electrical odometer for use in wheeled vehicles, comprising:
  (a) a transducer coupled to a wheel of the vehicle, such that angular rotation of said wheel produces a series of discrete signals;
  (b) means for transforming said discrete signals into a first pulse train of electrical signals which vary periodically with said discrete signals, with the waveform of said electrical signals being shaped for driving a logic element;
  (c) means for creating at least one dependent pulse train which is a fraction of said first pulse train, with said dependent pulse train being related to the first pulse train by a factor which is a rational number, and the dependent pulse train being synchronized with respect to the first pulse train;
  (d) means for conditioning said dependent pulse train to form a similar pulse train consisting of trigger pulses, each having approximately equal duration;
  (e) computer means for performing arithmetic operations and control functions;
  (f) means for selectively causing said computer means to perform an arithmetic operation upon the occurrence of each trigger pulse;
  (g) means for starting and stopping operation of said computer means;
  (h) a digital display for displaying distance values;
  (i) means for manually entering an initial distance value into the digital display;
  (j) means for selecting either a count-up mode or a count-down mode for the computer means, whereby distance increments may be added to or subtracted from the initial distance value in the digital display;
  (k) means for storing a calibration constant into the memory of said computer means, with said calibration constant corresponding to the actual distance traveled between trigger pulses which are passed to said computer means; and
  (l) means for recalling said calibration constant from said memory and for supplying said constant to the arithmetic part of the computer means, whereby said digital display is sequentially changed by the calibration constant upon the occurrence of each trigger pulse.

8. The electrical odometer as claimed in claim 7 wherein there are at least two dependent pulse trains, each being a different fraction of the first pulse train, and further including means for selecting which one of said dependent pulse trains will be passed to the computer means at a given time, whereby the update rate for said display may be determined by switching from one of the dependent pulse trains to another.

9. The electrical odometer as claimed in claim 8 wherein two of the dependent pulse trains differ by a factor of at least 16.

10. The electrical odometer as claimed in claim 7 wherein the means for manually entering the initial distance value is a numeric keyboard.

11. The electrical odometer as claimed in claim 7 wherein the transducer is coupled to a wheel of the vehicle through an element which is placed in series with the standard speedometer cable of the wheeled vehicle, whereby wheel rotation operates to simultaneously drive both the standard speedometer cable and the electrical odometer.

12. The electrical odometer as claimed in claim 11 wherein the element that is placed in series with the speedometer cable is adapted to be positioned immediately adjacent the transmission of the wheeled vehicle, and said element has treads that mate with the transmission housing.

13. An electrical odometer for use in a wheeled vehicle, comprising:
  (a) means for generating a series of electrical pulses which are related to actual distance traveled by the vehicle;
  (b) a digital display adapted to serve as an odometer register, with said register being adapted to visually reflect the distance traveled by the wheeled vehicle from the time that said pulse-generating means is activated;
  (c) means for converting the electrical pulses generated by the pulse-generating means into input signals for updating the digital display; and
  (d) means for permitting the rate at which said digital display is updated to be changed at will by the vehicle operator through use of a switch which is located in the vicinity of the digital display, and the calibration accuracy being the same after a display rate has been changed as it was before the display rate was changed.

* * * * *